Sept. 27, 1955 L. L. CUNNINGHAM 2,719,198
FIRE DETECTOR
Filed July 5, 1952

INVENTOR
Lewis L. Cunningham

BY

AGENT

United States Patent Office 2,719,198
Patented Sept. 27, 1955

2,719,198

FIRE DETECTOR

Lewis L. Cunningham, Los Altos, Calif.

Application July 5, 1952, Serial No. 297,293

18 Claims. (Cl. 200—137)

This invention pertains to over-temperature indicating or signalling means and particularly relates to an improved means for sensing a true over temperature condition of the motor of an airplane.

It should be understood that certain parts associated with the internal combustion engines of airplanes are subject to relatively high temperatures and that in some of these parts the increase of temperature over what is considered normal may indicate a quickly developing dangerous condition. For this reason it is not only essential to provide means for sensing the attainment of a critical temperature at particular locations about an airplane motor but it is equally essential that the sensing means be reliable in operation and not given to indicating a hazardous condition when none exists. It is essential that all of the heat influenced parts of the heat sensing means be equally exposed and directly exposed to the ambient conditions to be sensed in order to reduce to a minimum the time required for the detector to become stabilized and indicate the true temperature condition.

Again it should be understood that it has been found desirable to use a so called fire detector to follow the temperature change in a hot gas associated with the airplane engine and it is in an ambient hot gas in which the device of the present invention is provided to operate.

It is therefore a principal object of this invention to provide a reliable sensing means for the temperature of an ambient hot gas which will closely follow the temperature of the gas and rapidly and accurately indicate the attainment of a hazardous temperature.

It should further be understood that before the device of the present invention was available it was common practice to use as a hot gas temperature sensing means a closed tube of material having a relatively large temperature coefficient of expansion, the tube being in longitudinal tension and opposed by a pair of bowed contact carrying struts in longitudinal compression within the tube, the struts being of a material of lower temperature coefficient of expansion than the tube. In that type of instrument it is seen that, while the closed tube protected the contacts and eliminated the fire danger from arcing contacts, yet the tube sensed a temperature change in the ambient gas considerably ahead of the struts and therefore on a rapidly rising temperature such as is experienced in starting up a motor the detector might indicate an over temperature when none had occurred. It has been reported that airplane pilots have been forced into hazardous quick landings after takeoff due to this inexact operation of such instruments. In other cases the known characteristics of such instruments have caused the pilots to disconnect the fire detecting system while being air borne or until such time had elapsed as was required for the ambient heat to soak through the instrument.

It is therefore a second object of this invention to provide an ambient hot gas temperature sensing means in which all of the temperature sensitive parts of the temperature sensing instrument are directly exposed to the hot gas.

A third object is to provide such an instrument in which the temperature sensitive parts have a high ratio of heat absorbing surface to mass.

With instruments of types previously used in which the tube which enclosed the switching parts was used as the active temperature sensing element it was discovered that it was difficult to maintain the switch chamber in a hermetically sealed condition. It was also discovered that numerous apparently faulty operations of the switch were actually switch short circuits caused by water condensed in the switch chamber from the atmosphere. Because of the great range of atmospheric pressure and temperature encountered in aviation service air was found to enter and leave the only partially sealed switch chamber in large amounts.

It is therefore a fourth object to provide such an instrument in which the electric switching parts are enclosed in a switch housing of small volume and isolated hermetically from the atmosphere as well as from the corrosive hot gases the temperature of which is to be sensed.

A fifth object is to provide such an instrument in which it is not necessary for the temperature sensitive parts to be highly stressed mechanically and by the elimination of high mechanical stresses to avoid the deformation of the parts with repeated heat cycles which deformation gradually occurs with materials subjected to repeated heat cycles when under an excessive mechanical stress.

It is a sixth object to provide such an instrument having a high calibration stability due to the heat sensitive parts being only moderately stressed mechanically.

How these and other objects are attained is explained in the following description of a preferred form of my invention referring to the attached drawing in which Figure 1 is a view in side elevation of one form of the device of this invention.

In the several figures of the drawing like parts are indicated by like numerals of reference.

Figure 3:
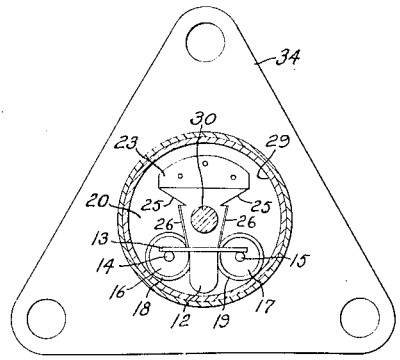
Figure 3 is a section along the line 3—3 of Figure 2.

Referring now to the drawing a preferred form of my invention comprises an electric switch having a stationary contact 11 welded to an ear 12 extending from a bar 13 welded to and supported by a pair of stiff conducting wires 14 and 15 fused respectively into glass beads 16 and 17 which in turn are fused to surrounding eyelets 18 and 19 which are inserted through holes in cup shaped barrier 20 to which eyelets 18 and 19 are hermetically sealed by brazing. The switch also includes a movable contact 21 welded to a resilient conducting blade 22 clamped by plate 23 to shelf 24 formed on barrier 20. Plate 23, blade 22, and shelf 24 are secured together by welding. As shown in Figure 3 resilient spring blade 22 is tapered at its sides as shown at 25 as it leaves plate 23 to form a cantilever hinge beam of uniform stress throughout the tapered area and is flanged at edges 26 to form a rigid beam section throughout its flanged length. The tapered area of blade 22 is formed to bias movable contact 21 against stationary contact 11. Spring cup 27 inserted in a hole in barrier 20 and hermetically sealed thereto by brazing carries spring 28 adapted to additionally bias moving contact 21 against stationary contact 11. It is seen that a natural production subassembly of my device comprises barrier 20 and the switch parts carried thereon as above described.

To complete a hermetically sealable housing for the switch of my device and to provide a flexible means in a wall of the housing through which the switch may be operated from outside the housing another natural production subassembly comprises cupped switch housing body 29 having an axially placed clearance hole through its closed end to accommodate the reduced diameter end section of switch operating rod 30. One end of hollow cylindrical metallic bellows 31 is closed and hermetically sealed by having brazed therein disk 32 through a central hole in which rod 30 is inserted and hermetically sealed to disk 32 by brazing. The other end of bellows 31 is brazed and hermetically sealed over the closed end of body 29. Parts 29, 30, 31, and 32 comprise the other basic sub-assembly noted above.

The two basic sub-assemblies noted above are then united to form as a more advanced sub-assembly a complete hermetically sealed switch with an external operating stem. Cupped barrier 20 is inserted into cupped housing body 29 as shown and the open cylindrical end of barrier 20 and the open cylindrical end of body 29 are brazed together.

The entire switch sub-assembly is then inserted into perforated tube 33 to a pre-determined axial position and body 29 is welded to tube 33. If the device is to be flange mounted, flange 34 is welded to tube 33 in the position shown.

Differential nut 35 having a different number of internal threads per inch than it has external threads per inch is threaded into sawed nut 36, the assembled nuts are inserted into tube 33 and nut 35 is threaded onto rod 33 to bring nut 36 to a predetermined position where it is welded to tube 33.

Ceramic insulator 37 is assembled onto terminal stud 38 between shoulder 39 of stud 38 and washer 40 where it is held securely in place by riveting or spinning the cupped end of stud 38 over washer 40. Conducting wire 15 is then threaded through the base of stud 38 and insulator 37 is inserted into the end of tube 33 to contact the cylindrical end of barrier 20. Insulator 37 is held securely in an axial direction by spinning the end of tube 33 over a shoulder on insulator 37 as shown and is prevented from rotation in tube 33 by denting tube 33 into a longitudinal groove in insulator 37. The end of wire 15 is brazed to the reduced outer end of stud 38.

In the single pole form of my device shown wire 14 is cut off within the cupped portion of barrier 20 since in this case wire 14 is used only as a support for bar 13. However in other forms of my device multiple insulated switch contacts may be used and multiple insulated terminal studs are provided. In the form shown the circuit to the switch is through the stud 38, wire 15 and bar 13 to the stationary contact and through the flange 34, tube 33, body 29 and barrier 20 to switch blade 22 and moving contact 21.

Figure 1:
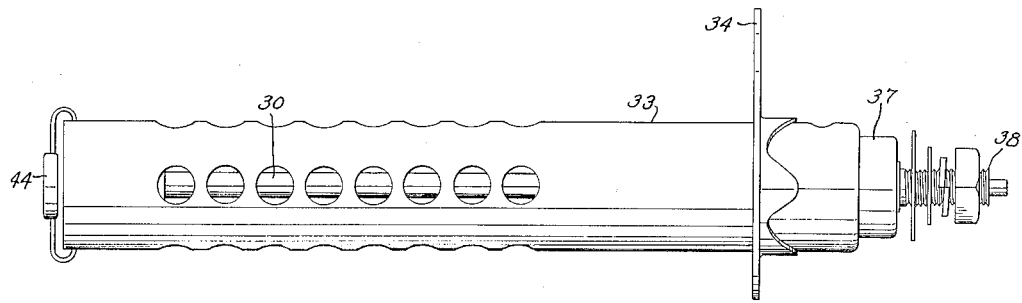
Figure 2:
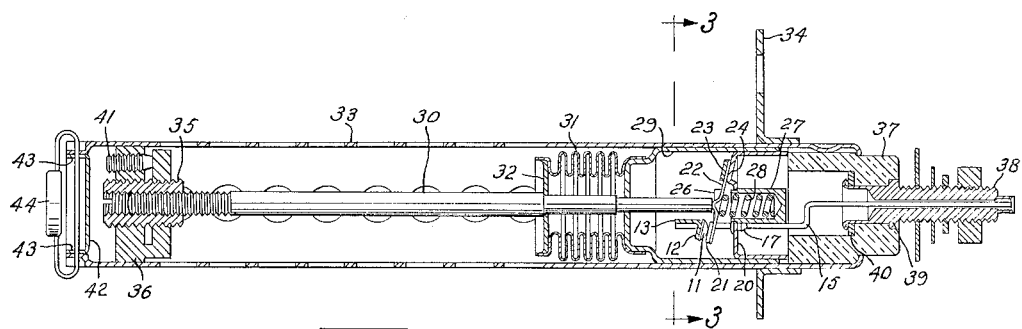
Figure 2 is a longitudinal section through the device of Figure 1.

The form of my device shown in Figures 1, 2, and 3 is a normally open switch form in which at normal temperatures the switch is open or the switch contacts are separated. Tube 33 and rod 30 both vary in length with temperature and the material of which they are made is selected to give the switch a desired motion of the switch operating rod 30 as the temperature varies. Rod 30 material compared with the material of which tube 33 is made has a relatively low thermal coefficient of expansion throughout the operating range of my device and tube 33 has a relatively high thermal coefficient of expansion. But since both rod 30 and tube 33 vary in length with temperature it is necessary for proper operation in accordance with the pre-determined calibration of the device that both the rod and tube be subjected simultaneously to the ambient gases in which the attainment of a preset temperature is the condition which the device is designed to indicate or signal.

It is to be noted that in my device tube 33 is perforated as shown to allow free circulation of the ambient gases around tube 33 and within tube 33 and around rod 30. Since the ratio of cross section area to exposed surface of rod 30 and tube 33 is approximately the same, it is seen that my device is admirably designed to operate at its calibrated setting substantially without regard to the rate of change of temperature of the ambient gases.

How my device operates is as follows. Assuming that the tube 33 is located in a region of normally cool ambient gas and tube 33 is consequently reduced in length so that even though rod 30 is reduced in length a lesser amount, rod 30 presses on switch blade 22, and has overcome the bias of blade 22 and spring 28 and is holding moving contact 21 separated from stationary contact 11. Then assume that the temperature of the ambient gas rises and while circulating through and around tube 33 the ambient gas causes rod 30 and tube 33 to rise in temperature with the gas. Rod 30 and tube 33 both elongate but tube 33 elongates in greater amount than rod 30 and rod 30 gradually backs away from switch blade 22 which follows the receding rod under the biasing forces of spring 28 and the hinge section of blade 22. At the temperature of calibration rod 30 has receded to the position shown in Figure 2 to allow moving switch contact 21 to contact stationary contact 11.

Calibration of the device is accomplished by subjecting the device to the calibration temperature and positioning rod 30 axially with respect to tube 33 by turning differential nut 35 about rod 30 and in sawed nut 36. Differential nut 35 has a screw driver slot across its outer end to facilitate this adjustment. When the proper calibration has been achieved set screw 41 threaded into one leg of sawed nut 36 is turned and forced tightly against the other leg of nut 36 to separate the free ends of the legs of nut 36 and thus securely clamp nut 35 in its adjusted position in nut 36.

After my device is calibrated a disk 42 having ears 43 is inserted into the end of tube 33 and held in place by a sealing wire inserted through holes in indentations in tube 33, as shown, through holes in ears 43, as shown, and has its ends sealed together in a compression seal on which the calibration temperature is stamped.

It should be noted that in my device very slight stresses are required to operate the switch and therefore very slight stresses are placed on the exposed temperature sensitive parts 30 and 33. For this reason there is little influence in my device to cause the temperature sensitive parts to take a permanent set as would be the case if large mechanical stresses were placed on the parts repeatedly at high temperature.

Figure 4:
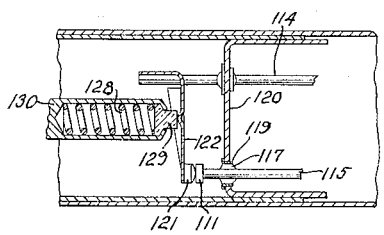
Figure 4 is a fragmental sectional view of the switch of the device of this invention in which the switch is of the normally closed type as differentiated from the switch of Figure 2 which is of the normally open type.

It should also be noted that in my device high temperatures with consequently relatively large movements of operating rod 30 do not over strain the switch blade and associated parts, for as shown in Figure 2 for the normally open switch when the temperature of calibration has been attained additional motion of rod 30 merely caused rod 30 to leave blade 22 entirely. Should a normally closed switch be desired as shown in fragmentary section in Figure 4, switch blade 122 is carried on stiff conducting wire 114 and is formed with a flexible hinge section adapted to bias movable contact 121 away from stationary contact 111. Stationary contact is welded to stiff conducting wire 115. Wires 114 and 115 are insulatedly supported by and hermetically sealed into barrier 120 by being fused to glass beads 117 fused into eyelets 119 brazed to barrier 120.

To prevent destructive deformation of switch blade 122 due to overtravel of rod 130 on cooling, the end of rod 130 is bored to receive spring 128 and shouldered ceramic plunger 129 slidably confined in the bore of rod 130 by the inwardly spun end of rod 130. With this arrangement when the temperature sensitive rod and tube parts of the device cool to a lesser temperature than that to which the device is calibrated ceramic plunger 129 recedes as required into the bore of rod 130 against the outward bias of spring 128 and blade 122 can only be subjected to the bending force of spring 128.

Having thus explained the difficulties encountered with previously available fire detector mechanisms and the discovery of ways to overcome these difficulties and having explained the construction of preferred forms of the mechanism I have invented to implement these discoveries and having explained the operation of these mechanisms, I claim:

1. A temperature responsive electric switching means comprising a switch housing, an electric switch hermetically sealed within said housing, and means for operating said switch from outside said housing, said switch housing comprising a tubular body means, a high temperature resistant metallic barrier means adapted hermetically to close one end of said body means, and a flexible means adapted hermetically to close the other end of said body means, said electric switch comprising a stationary contact, terminal means adapted to support said stationary contact, said terminal means being adapted to extend through said barrier means, ceramic means fused to said barrier means and said terminal means and means adapted insulatedly to seal hermetically said terminal means in said barrier, a lever, a movable contact carried on said lever, means adapted hingedly to mount said lever within said housing, and biasing means adapted resiliently to bias said lever towards one relative position of said contacts, said operating means comprising a temperature responsive means having an end secured to said housing and outside thereof, a movable end within said housing adapted to move relative to said fixed end in response to a temperature change and means intermediate the said ends of said temperature responsive means adapted to adjust the relative positions of said fixed end and said movable end whereby on a rise in temperature said movable end of said operating means is adapted to cooperate with said biasing means to change the bias of said biasing means and at a pre-set temperature to move said lever away from said one relative position of said contacts.

2. The device of claim 1 in which said flexible means comprises a metallic bellows.

3. The device of claim 1 in which said lever means is made of resiliently flexible material and said biasing means comprises a section of said lever means.

4. The device of claim 1 in which said biasing means comprises a resilient means interposed between said barrier means and said lever means.

5. The device of claim 1 in which a sub-assembly of said device comprises said barrier means and said electric switch, said barrier having a hole formed therethrough, said terminal means being adapted to extend through said hole in said barrier and said means adapted insulatedly to seal hermetically said terminal in said housing comprising a glass bead surrounding said terminal in said hole, said glass bead being fused to both said terminal and said barrier means.

6. The device of claim 1 in which said means for operating said switch comprises a metal tube having a relatively higher temperature coefficient of expansion, a rod means having a relatively lower temperature coefficient of expansion, said rod means being located coaxially with and within said tube, means engaging one end of said tube and one end of said rod means adapted to adjust the axial position of said rod means in said tube, means securing the other end of said tube to said body means and means adapting the other end of said rod means at a pre-set temperature to move said lever.

7. The device of claim 6 in which a sub-assembly of said device comprises said body means, said flexible means adapted to close said other end of said body means, and said rod means, said flexible means comprising a metallic bellows having an open end and a closed end, the open end of said bellows being hermetically sealed to said other end of said body means, the closed end of said bellows being formed with an axial hole therethrough, said rod means being adapted to extend through said axial hole and fusion means adapted to fill the space in said axial hole around said rod whereby said rod is hermetically sealed to said bellows.

8. The device of claim 6 in which said metal tube is multiply perforated throughout part of its length whereby ambient hot gases will be free to circulate about the inside as well as the outside of said tube and circulate around said rod means within the perforated portion of said tube.

9. For an electric switch, a temperature sensitive operating mechanism adapted for immersion in hot ambient gas adjacent an airplane engine for the purpose of detecting an incipient fire condition and operating said switch to signal said condition without error due to the differences in exposures and heat storage capacities of the parts of said mechanism, said mechanism comprising a rod having a low temperature coefficient of expansion, a tube having a higher temperature coefficient of expansion relative to said rod, and means adapted to impress on said switch the differential change in length with change in temperature of said rod and said tube, said rod being coaxial within and spaced from the inner wall of said tube and the wall of said tube being discontinuous to allow the free passage of ambient gas to the interior thereof, the reduction of the heated surface of said wall of said tube by said discontinuity thereof being for the purpose of securing a desired ratio of exposed surface to heat storage capacity of said tube as determined by the ratio of exposed surface to heat storage capacity of said rod.

10. A fire detector adapted for use in indicating an abnormal temperature condition at a selected position near an element of an airplane engine, said fire detector comprising an electric switch means and an operating means for said electric switch means, said electric switch means including a high temperature resistant hermetically sealed metallic case therefor, said case comprising an axially flexible high temperature resistant metallic bellows, said operating means comprising a cylindrical element having a relatively high coefficient of thermal expansion secured axially at one end to said case for said switch means, an operating rod means for said switch having a relatively low coefficient of thermal expansion located axially within said cylindrical element externally of said case, said rod means forming part of the end wall of said bellows and extending axially through said end wall into the interior of said case, and means operatively connecting the end of said cylindrical member away from said case and the end of said rod outside said case adjustably to position said rod axially of said cylindrical member.

11. The fire detector of claim 10 in which an electric conducting element of said switch penetrates a metallic wall of said case through a hole formed therethrough and in which said conducting element is mechanically fixed to said metallic wall but electrically insulated therefrom by a ceramic bead externally fused to said wall and internally fused to said conducting element, thereby maintaining the hermetically sealed condition of said case without reducing the high temperature resistance and permanence thereof.

12. The device of claim 11 in which said switch includes a stationary contact member and a movable contact member and in which one of said contact members is supported on said conducting element internally of said hermetically sealed case and electrically insulated therefrom.

13. The device of claim 12 in which said stationary contact member is supported on said conducting element and including resilient means carried on the interior of said case adapted to bias said movable contact towards said stationary contact and in which the position of said moving contact when away from said stationary contact is determined by the position of the end of said operating rod internal of said case whereby during the entire range of movement of said movable contact the axial compressive stress on said operating rod and the axial tensile stress on said cylindrical temperature responsive element will be required to be only equal to the biasing force of said resilient means on said movable contact and thereby prevent the disturbance of the calibration of said fire detector by preventing the overstressing of said operating rod and said cylindrical element at elevated temperatures.

14. The device of claim 12 in which said movable contact member is supported on said conducting element and including resilient means carried on the end of said operating rod internally of said case adapted to bias said movable contact toward said stationary contact whereby during the complete range of movement of said operating rod the limit of compressive stress in said operating rod and the tensile stress in said cylindrical element will be required to be only equal to the biasing force of said resilient means on said movable contact and thereby prevent the disturbance of the calibration of said fire detector by preventing the overstressing of said operating rod and said cylindrical element at elevated temperatures.

15. The fire detector of claim 10, in which said means operatively connecting the end of said cylindrical member away from said case and the end of said rod outside said case adjustably to position said rod axially of said cylindrical member comprises an internally threaded plug means secured axially to said last mentioned end of said cylindrical member, threads formed on the last mentioned end of said rod and a bushing interposed between said plug and said rod, said bushing being externally threaded to engage said internal threads in said plug and internally threaded to engage said threads on said rod, said internal and external threads on said bushing being of different pitch whereby by turning said bushing the axial position of said rod relative to said cylindrical member will be adjustable at a rate differential to the pitch of said internal and external threads of said bushing.

16. The fire detector of claim 10 in which said cylindrical element is perforated throughout part of its length whereby ambient hot gases will be free to circulate about the inside as well as the outside of said tube and circulate around the part of said rod means within said cylindrical means and outside said case.

17. The fire detector of claim 16 in which the metal removed from said cylindrical element by the said perforation thereof is such that ratio of cross sectional area to surface area of said cylindrical element is in a desired relation to the ratio of cross sectional area to surface area of rod means whereby the relation of heat storage capacity to the surface exposed directly to hot and ambient gases respectively of said cylindrical element and said rod means will provide a desired variation of hot ambient gas operating temperature for said switch as varied by the rate of change of temperature of said ambient gases.

18. A coaxial differentially expanding rod and tube type of temperature sensitive operating mechanism for an electric switch, said mechanism being adapted to minimize the effect of heat storage of the rod and tube elements on the rate of response of said switch to changes of temperature of an ambient gas in which said mechanism is immersed, said switch comprising a fixed contact and a movable contact, one end of said tube being secured in fixed relation to said fixed contact, the adjacent end of said rod being resiliently mounted axially of said tube, said movable contact being adapted to move with said resiliently mounted end of said rod, means adapted to secure the other ends of said rod and said tube in a desired axial relation and means adapted to expose the surface areas of said rod and said tube to said ambient gas in respective desired relations to their heat storage capacities.

References Cited in the file of this patent

UNITED STATES PATENTS

| Number | Name | Date |
|---|---|---|
| 862,753 | Pilcher | Aug. 6, 1907 |
| 1,321,287 | Daly et al. | Nov. 11, 1919 |
| 1,940,300 | Gerdien et al. | Dec. 19, 1933 |
| 2,272,249 | Persons | Feb. 10, 1942 |
| 2,304,103 | Kelly | Dec. 8, 1942 |
| 2,384,153 | Bower | Sept. 4, 1945 |
| 2,420,105 | Sparrow et al. | May 6, 1947 |
| 2,494,660 | Kathe | Jan. 17, 1950 |